(12) United States Patent
Efimov

(10) Patent No.: US 8,139,209 B2
(45) Date of Patent: Mar. 20, 2012

(54) SYSTEM AND METHOD FOR MEASURING A LASER-INDUCED DAMAGE THRESHOLD IN AN OPTICAL FIBER

(75) Inventor: Oleg M. Efimov, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 665 days.

(21) Appl. No.: 12/268,040

(22) Filed: Nov. 10, 2008

(65) Prior Publication Data

US 2010/0118295 A1    May 13, 2010

(51) Int. Cl.
*G01N 21/00* (2006.01)
(52) U.S. Cl. ....................................... 356/73.1
(58) Field of Classification Search .................. None
See application file for complete search history.

(56) References Cited

U.S. PATENT DOCUMENTS

| | | | | |
|---|---|---|---|---|
| 4,021,217 A | * | 5/1977 | Bondybey et al. | 65/378 |
| 4,208,126 A | * | 6/1980 | Cheo et al. | 356/51 |
| 4,385,832 A | * | 5/1983 | Doi et al. | 356/73.1 |
| 5,172,421 A | * | 12/1992 | Nakamura et al. | 382/141 |
| 5,370,643 A | * | 12/1994 | Krivoshlykov et al. | 606/16 |
| 5,394,411 A | * | 2/1995 | Milchberg et al. | 372/5 |
| 5,469,252 A | * | 11/1995 | Doles et al. | 356/73.1 |
| 5,684,545 A | | 11/1997 | Dou et al. | |
| 5,880,825 A | * | 3/1999 | Jakobsen et al. | 356/73.1 |
| 5,953,113 A | * | 9/1999 | Poffenbarger | 356/73.1 |
| 6,639,658 B2 | * | 10/2003 | Todo et al. | 356/73.1 |

OTHER PUBLICATIONS

Efimov, O.M., "Self-optical breakdown and multipulse optical breakdown of transparent insulators in the femto-nanosecond region of laser pulse widths", J. Opt. Technol., 71:338-347 (2004).
Efimov, O.M., "Time dependence of the optical breakdown thresholds of glasses under the action of single-frequency laser radiation", J. Opt. Technol., 63(2):120-124 (1996).

* cited by examiner

*Primary Examiner* — Tarifur Chowdhury
*Assistant Examiner* — Gordon Stock, Jr.
(74) *Attorney, Agent, or Firm* — Moore & Van Allen PLLC; Charles L. Moore

(57) ABSTRACT

A system for measuring a laser-induced damage threshold in an optical fiber may include a lens to direct a first laser beam through a core of the optical fiber. The system may also include an optical arrangement to direct a second laser beam through an exterior surface of the optical fiber and into the core of the optical fiber at a preselected location of the optical fiber to provide a predetermined power density at the preselected location, wherein the optical arrangement causes the second laser beam to be directed into the optical fiber substantially completely around a perimeter of the optical fiber to provide the predetermined power density.

30 Claims, 4 Drawing Sheets

SYSTEM AND METHOD FOR MEASURING A LASER-INDUCED DAMAGE THRESHOLD IN AN OPTICAL FIBER

FIELD

The present disclosure relates to high power fiber lasers and systems, and more particularly to a system and method for measuring a laser-induced damage threshold in an optical fiber that may be used in a laser system.

BACKGROUND

High power fiber lasers and systems have many advantages compared to solid state systems. For example, fiber lasers and systems have more flexibility in transmitting a laser beam, are less susceptible to environmental or external conditions compared to open air and provide more flexibility in directing or focusing the laser beam on an object. Additionally, such systems can be significantly less bulky and mobile compared to solid state systems. However, one limitation of fiber lasers is that current optical fibers are susceptible to damage or degradation as laser power is increased. More robust optical fibers and fiber laser systems are under development. These new optical fibers and fiber laser systems need to be evaluated and tested. Systems and techniques to obtain quantitative data about laser-induced damage in fibers and transmitted beam quality degradation in optical fibers under increasing laser power conditions and various other laser parameters or characteristics are needed for high power fiber laser development.

Techniques for laser-induced damage threshold measurement in transparent solid materials are known. FIG. 1 is a schematic diagram of an example of a prior art system 100 for measuring laser-induced damage thresholds in a solid state material 102. A pulsed laser beam 104 having predetermined parameters is focused by a lens 106 into the solid material 102. The focusing of the laser beam 104 results in a substantial increase in power density of the beam 104 because the power density is equal to the laser power which may be in watts divided by an area which may be in square centimeters. As a result of the focusing, an initial area illustrated by broken line 108 of about a few square centimeters ($cm^2$), for example, may be decreased down to an area illustrated by broken line 110 of about ($10^{-6}$-$10^{-8}$) $cm^2$ in this example. Therefore, the initial power density in area 108 which results in damage is increased by focusing by a factor of about $10^6$-$10^8$ in the area 110. For example, by focusing a nanosecond laser pulse with energy of about 10 millijoules ($10^{-2}$ J) and pulse duration of about 10 nanoseconds ($10^{-8}$ s) into an area of about 10 microns (~$10^{-6}$ $cm^2$) a power density of about $10^{-2}$ J/($10^{-8}$ s*$10^{-6}$ $cm^2$)=$10^{12}$ $W/cm^2$. The energy (or the power which is (energy)/(pulse duration)) of laser pulse 104 may then be increased up to the moment the solid material 102 sustains damage. The damage can be observed by different simultaneous events, such as a residual crack in the damaged area; a visible cloud of plasma in the area of damage at the moment of damage; truncation of beam 104 transmitted through the focus area 110; and scattering of visible light of a continuous wave (CW) laser from the damaged area. CW lasers are typically used for damage visualization.

A similar technique to that described above for measuring laser-induced damage thresholds in a solid material cannot be used for measuring laser-induced damage thresholds in optical fibers. Referring to FIG. 2, FIG. 2 is a cross-sectional view of an example of a conventional optical fiber 200 and representation of a laser beamlet 202 propagating through the optical fiber 200. The optical fiber 200 includes a core 204 and a cladding 206 surrounding the core 204. The cladding 206 has a refractive index a little lower than the core. Therefore, the beams 202 in the fiber core 204 experience total internal reflection at the "core-cladding" boundary 208 as illustrated in FIG. 2 and cannot be influenced from outside. Because of the design of the optical fiber 200, the power density distribution of a laser beam in the core 204 will be identical at any cross section of fiber, i.e., it is not possible to focus the beam propagating through the fiber 200 and develop some area with enhanced intensity needed to perform a laser-induced fiber damage test.

BRIEF SUMMARY

In accordance with one embodiment, a system and method for measuring a laser-induced damage threshold in an optical fiber may utilize controlled simultaneous external and internal irradiation of a core of an optical fiber using separate laser beams. A laser beam or laser pulses may be propagated internally through the core of the optical fiber and at the same time an external laser beam of a predetermined power or intensity level may be directed or focused on an external portion of the optical fiber. The system and method allows localizing rather long areas or portions of the optical fiber with enhanced intensity at a predetermined location in the core of the optical fiber and permits observation and measurement of fiber parameters under the predetermined power level exposure.

In accordance with one embodiment, a system for measuring a laser-induced damage threshold in an optical fiber may include a lens to direct a first laser beam through a core of the optical fiber. The system may also include an optical arrangement to direct a second laser beam through an exterior surface of the optical fiber and into the core of the optical fiber at a preselected location of the optical fiber to provide a predetermined power density at the preselected location, wherein the optical arrangement causes the second laser beam to be directed into the optical fiber substantially completely around a perimeter of the optical fiber to provide the predetermined power density.

In accordance with one embodiment, a system for measuring a laser-induced damage threshold in an optical fiber may include an axicon. An opening may be formed in the axicon through which the optical fiber may extend. A cell may be optically coupled to the axicon. A portion of the optical fiber under test may be contained within the cell. The cell may include an input window to receive a laser beam from the axicon. The axicon may direct the laser beam through the input window of the cell and onto the optical fiber substantially completely around a perimeter of the optical fiber to provide a predetermined power density at a preselected location in a core of the optical fiber. The cell may contain an immersion liquid. The immersion liquid may have a refractive index substantially similar to a refractive index of a cladding of the optical fiber to permit a substantial portion of the laser beam to pass through the cladding and into the core of the optical fiber.

In accordance with one embodiment, a method for measuring a laser-induced damage threshold in an optical fiber may include directing a first laser beam through a core of the optical fiber. The method may also include directing a second laser beam through an exterior surface of the optical fiber and into the core of the optical fiber at a preselected location of the optical fiber to provide a predetermined power density at the preselected location. The second laser beam may be directed into the optical fiber substantially completely around a perimeter of the optical fiber to provide the predetermined power density.

In accordance with one embodiment, a method for measuring a laser-induced damage threshold in an optical fiber may include directing a laser beam through an exterior surface of the optical fiber and into a core of the optical fiber at a preselected location of the optical fiber. The laser beam may be directed into the optical fiber substantially completely around a perimeter of the optical fiber to provide a predetermined power density at the preselected location in the core of the optical fiber. The method may also include increasing an energy level of the laser beam in predetermined steps to measure an energy level at which laser-induced damage occurs.

Other aspects and features of the embodiments, as defined solely by the claims, will become apparent to those ordinarily skilled in the art upon review of the following non-limited detailed description in conjunction with the accompanying figures.

BRIEF DESCRIPTION OF THE SEVERAL
VIEWS OF THE DRAWINGS

The following detailed description of embodiments refers to the accompanying drawings. Other embodiments having different structures and operations do not depart from the scope of the present disclosure.

DETAILED DESCRIPTION

The following detailed description of embodiments refers to the accompanying drawings, which illustrate specific embodiments. Other embodiments having different structures and operations do not depart from the scope of the present disclosure.

Figure 1:
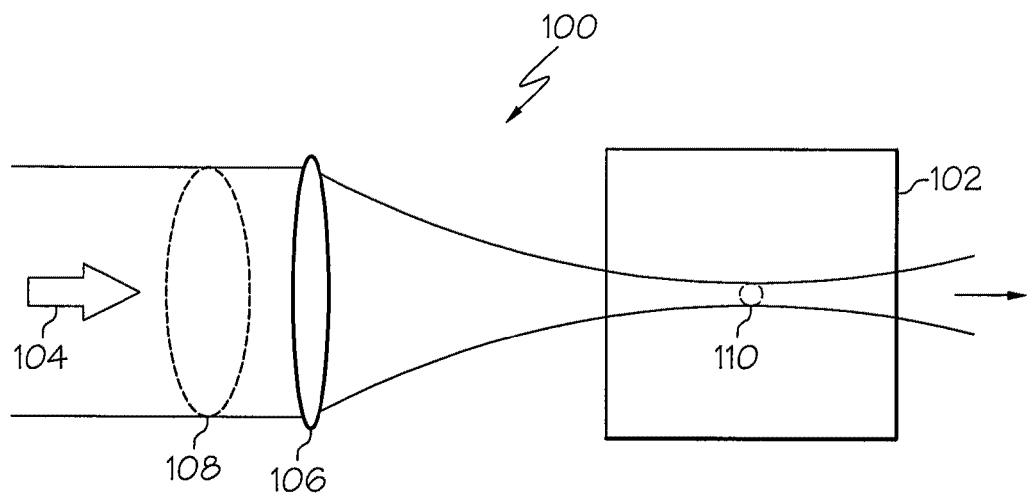
FIG. 1 is a schematic diagram of an example of a prior art system for measuring a laser-induced damage threshold in a solid material.
Figure 2:
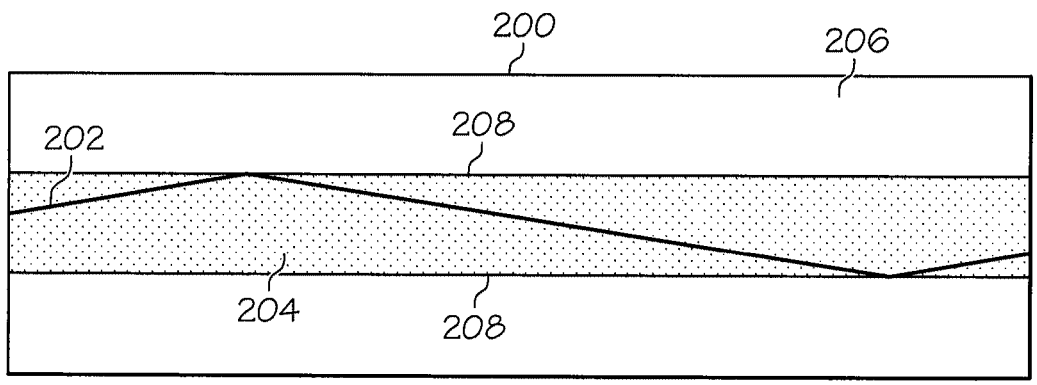
FIG. 2 is a cross-sectional view of an example of a conventional optical fiber and representation of a laser beamlet propagating through the optical fiber.
Figure 3:
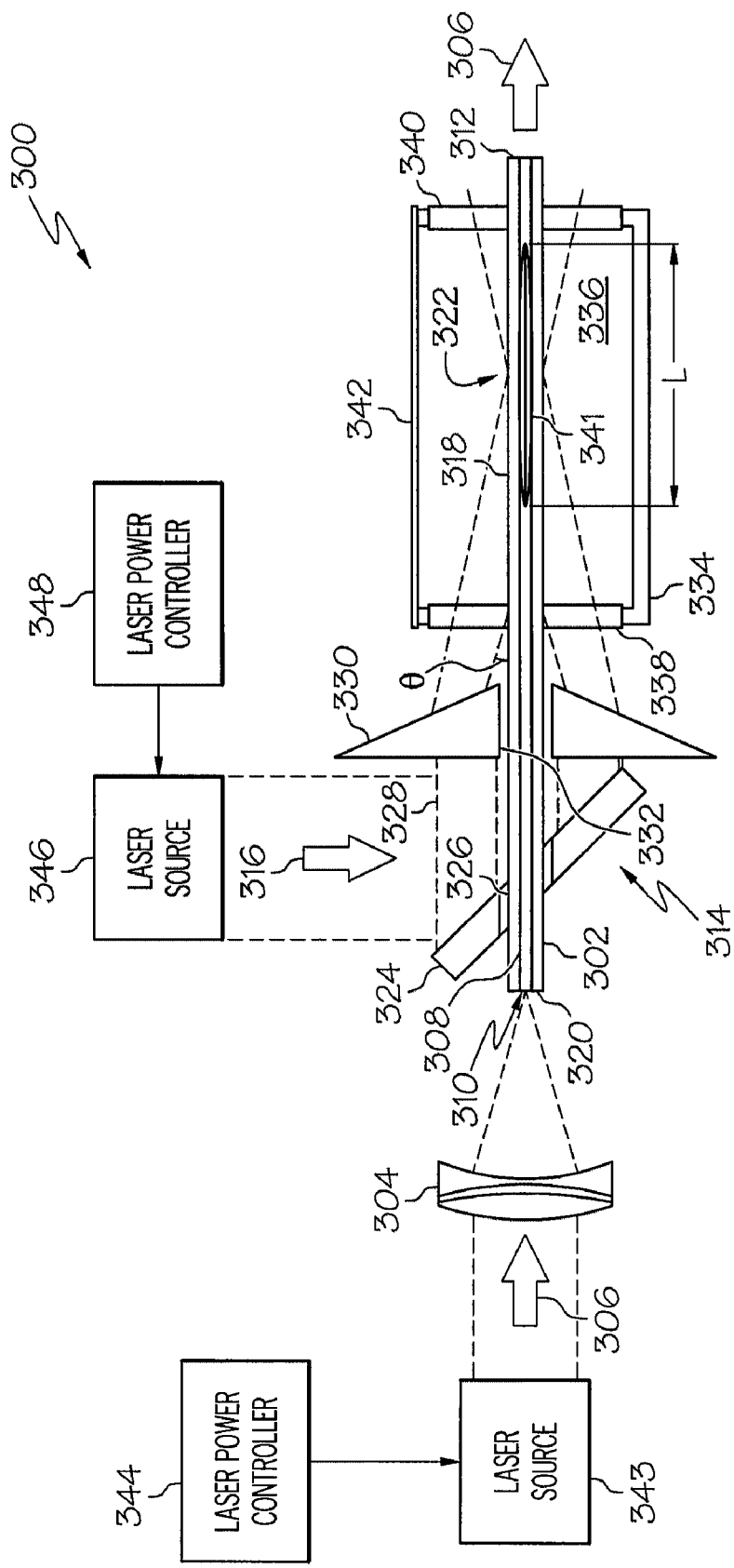
FIG. 3 is a schematic diagram of an example of a system for measuring a laser-induced damage threshold in an optical fiber in accordance with an embodiment.

FIG. 3 is a schematic diagram of an example of a system 300 for measuring a laser-induced damage threshold in an optical fiber 302 in accordance with one embodiment. The system 300 may include a lens 304 to direct a first laser beam 306 through a core 308 of the optical fiber 302. The first laser beam 306 may be focused by the lens 304 on an end surface 310 of the core 308 of the fiber 302. The lens 304 has an appropriate numerical aperture to provide efficient coupling between the first laser beam 306 and the core 308. The first beam 306 will propagate through the core 308 and exit or decouple from an opposite end 312 of the fiber 302.

The system 300 may also include an optical arrangement 314 to direct a second laser beam 316 through an exterior side surface 318 of the optical fiber 302, through a cladding 320 of the fiber 302 and into the core 308 of the fiber 302 at a preselected location 322. As described in more detail herein, the optical arrangement 314 may include a structure to direct the second laser beam 316 through the exterior surface 318 and into the core 308 of the fiber 302 along a predetermined length "L" of the fiber 302. As also described herein, the optical arrangement 314 may include components to cause the second laser beam 316 to be directed into the optical fiber 302 substantially completely around a perimeter of the fiber 302 to provide a predetermined power density in the core 308 at the preselected location 322.

The optical arrangement 314 may include a mirror 324 to receive and reflect the second laser beam 316. An opening 326 may be formed in the mirror 324 to receive the optical fiber 302. The optical fiber 302 to be tested may be disposed or inserted through the opening 326 which may be in the center of the mirror 324 to allow accurate positioning of the fiber 302 along an optical axis of the optical arrangement 314. The mirror 324 and opening 326 may form the second laser beam 316 into a substantially annular shaped laser beam 328.

The optical arrangement 314 may also include an axicon 330. The axicon 330 is optically coupled to the mirror 324 to receive the substantially annular shaped second laser beam 328 and to direct or focus the laser beam 328 onto the exterior side surface 318 of optical fiber 302 at the preselected location 322 or along the predetermined length L. An opening 332 may be formed in the axicon to receive the fiber 302. The axicon 330 may be a substantially conical shaped lens with the opening 332 formed in the center of the cone to allow accurate positioning of the fiber 302 along the axis of the optical arrangement 314. The axicon 330 have a height and base corresponding to an expected footprint or aperture of the laser beam 328 and desired preselected length or portion of the fiber 302 to be tested.

The angle between the second beam 316 or annular shaped beam 328 and the side surface 318 of the fiber 302 from the axicon 330 may be extremely small or shallow. In other words, the angle of incidence or the angle between the beam 328 and the normal to the side surface 318 of the fiber 302 is rather large. Accordingly, power losses can be significant because of reflection of the beam 328 from the surface 318 of the fiber 302. Additionally, the cross-section of the fiber 302 being tested may be a non-cylindrical shape. For example the cross-section 302 of the fiber 302 may be D-shaped, rectangular, hexagonal or other non-cylindrical shape. Non-cylindrical cross-sectional shapes may result in aberrations of the focused beam 316. To substantially exclude such losses and aberrations, the optical arrangement 314 may also include a specially designed optical element or cell 334. The fiber 302 or preselected location 322 or portion of the fiber 302 to be tested may be inserted in the cell 334. An immersion liquid 336 may be contained in the cell 334. The immersion liquid 336 has a refractive index substantially similar to a refractive index of the cladding 320 of the fiber 302 to permit a substantial portion of the annular shaped laser beam 328 or second laser beam 316 to pass through the cladding 320 and into the core 308 of the fiber 302 rather than being reflected or lost. An example of immersion liquid 336 may be a fused silica matching liquid, such as Cargille Labs code 50350, catalogue #19569 immersion liquid, which is available from Cargille Labs of Cedar Grove, N.J. or a similar immersion liquid or matching liquid that matches the refractive index of the fiber 302.

The cell 334 may include an input window 338 to receive the laser beam 316 from the axicon 330 and allow the beam 316 to be focused or directed on the fiber 302 at the preselected location. The cell 334 may also include an output window 340 to permit observation of the fiber 302 for detection of any laser-induced damage 341 and to permit alignment of the fiber 302 relative to the first beam 306 and the second beam 316. The cell 334 may include a cylinder 342, a tubular structure or other structure capped at one end by the input window 338 and the opposite end by the output window 340. Openings may be formed in each of the input window 338 and the output window 340 for the fiber 302 to pass through the cell 334. The cell 334 may also have sides which are non-cylindrical. The cylinder 342 or sides of the cell 334 may also be transparent for viewing the fiber 302 and detecting any laser-induced damage 341. The cell 334 may a capillary tube, glass, fused silica or similar material with a cavity for the immersion liquid 336 and openings on the ends for the fiber 302 to be inserted through the cell 334. Seals may be used around the fiber 302 at the openings to retain the immersion fluid 336 within the cell 334. The fiber 302 to be tested may be extended through the sealed opens in input and output windows 338 and 340. After sealing the openings, the cell 334 may be filled with the immersion liquid 336 through another opening in the cell 334 (not shown in the Figures).

In accordance with one embodiment, the first laser beam 306 may be produced by a first laser source 343. The power and other parameters of the first laser beam 306 may be controlled by a laser power controller 344. The second laser beam 316 may be produced by a second laser source 346 and the power and other parameters of the second laser beam 316 may be controlled by another laser power controller 348. The controllers 344 and 348 may be integrated as part of the respective laser sources or systems 343 and 346. The laser sources 343 and 346 may be the same for generating the same type laser beam or may be different for generating different types of laser beams including beams having different power levels, pulse durations, wavelengths and other parameters.

In accordance with another embodiment, only laser source 346 may be provided to direct or focus a laser beam on the side surface 318 of the optical fiber 302. In this embodiment, no laser beam would be propagated through the core 308 of the fiber 302.

Figure 4:
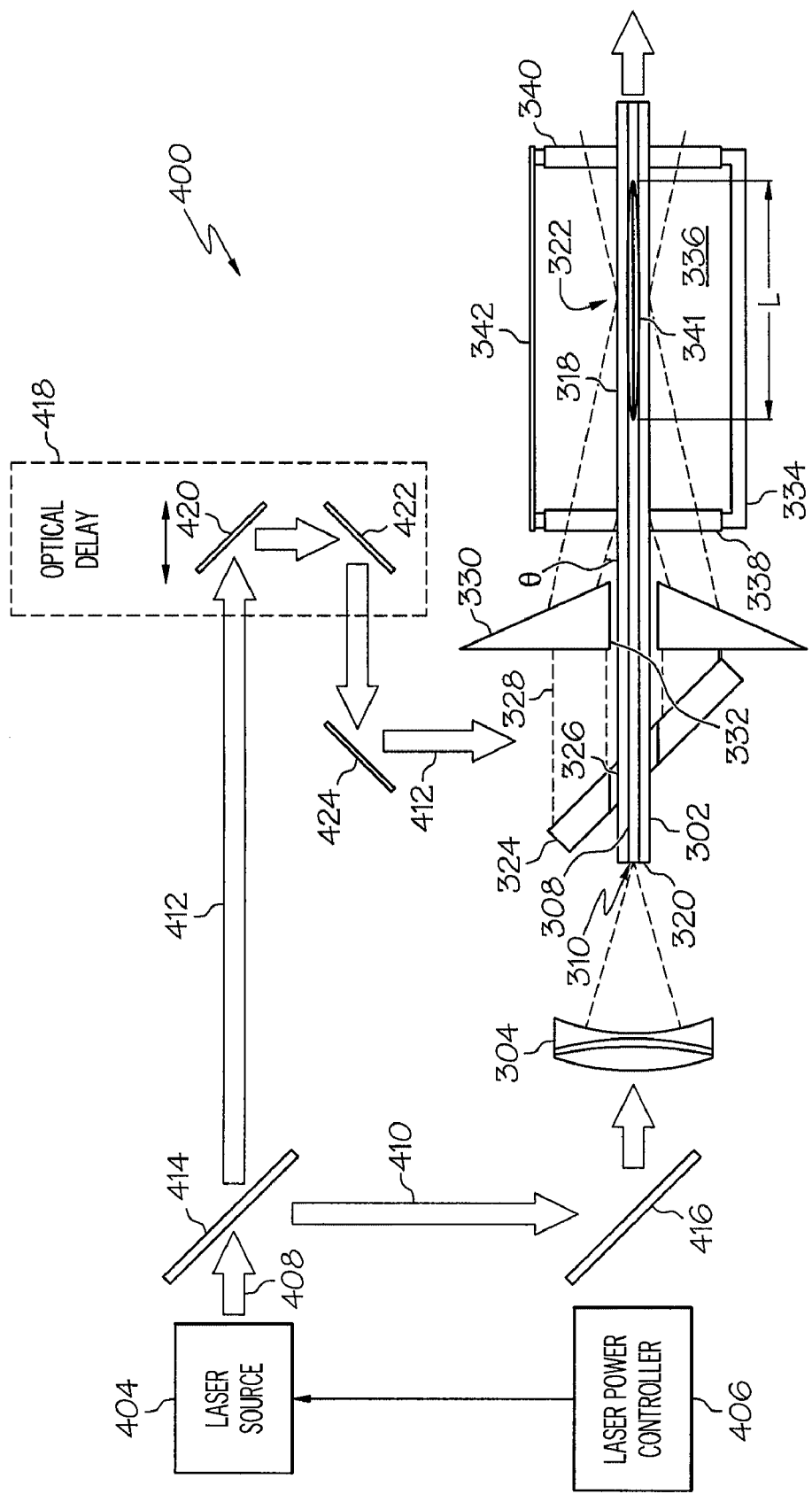
FIG. 4 is a schematic diagram of an example of a system for measuring a laser-induced damage threshold in an optical fiber in accordance with another embodiment.

In accordance with another embodiment as shown in FIG. 4 only a single laser source may be provided. FIG. 4 is a schematic diagram of an example of a system 400 for measuring a laser-induced damage threshold in the optical fiber 302 in accordance with another embodiment. The system 400 may be similar to the system 300 except that a single laser source 404 may be used. Accordingly, the same reference numerals in FIG. 4 refer to the same elements or components in FIG. 3. The laser source 404 may be controlled by a laser power controller 406 to control a power level, pulse duration, wavelength and other parameters or characteristics of a laser beam 408 from the laser source 404. The laser power controller 406 may also be integrated with the laser source 404 to form a laser system. The laser beam 408 from the source 404 may be split to form a first laser beam 410 and a second laser beam 412. A beam splitter 414 may split the laser beam 408 into the first laser beam 410 and the second laser beam 412. The first laser beam 410 may be directed or reflected by a suitable optical component or components, such as mirror 416 to lens 304. The lens 304 focuses or directs the first beam 410 on the core 308 of the fiber 302 to direct the first beam 410 through the core 308.

The second beam 412 may be directed through an optical delay 418. The optical delay 418 may include a pair of mirrors 420 and 422 and/or optical components to provide a predetermined time delay of the second beam 412. The second beam 412 after exiting the time delay 418 may then be reflected by another mirror 424 to the mirror 324 with the opening 326 formed therein similar to that previously described. The system 400 may then operate similar to the system 300 previously described. The optical delay 418 provides synchronization of first and second pulsed beams 410 and 412. Synchronization of the first and second pulsed beams 410 and 412 is important when beams with short pulses are used. For instance, a 100-picosecond pulse beam has a physical length of about 3 cm; a 100-femtosecond pulse beam has a physical length of about 30 microns. Therefore, it is necessary to have some mechanism for adjustment of the moments or timing of exposure from the different beams. Otherwise, the exposures from different beams will be done independently.

Figure 5:
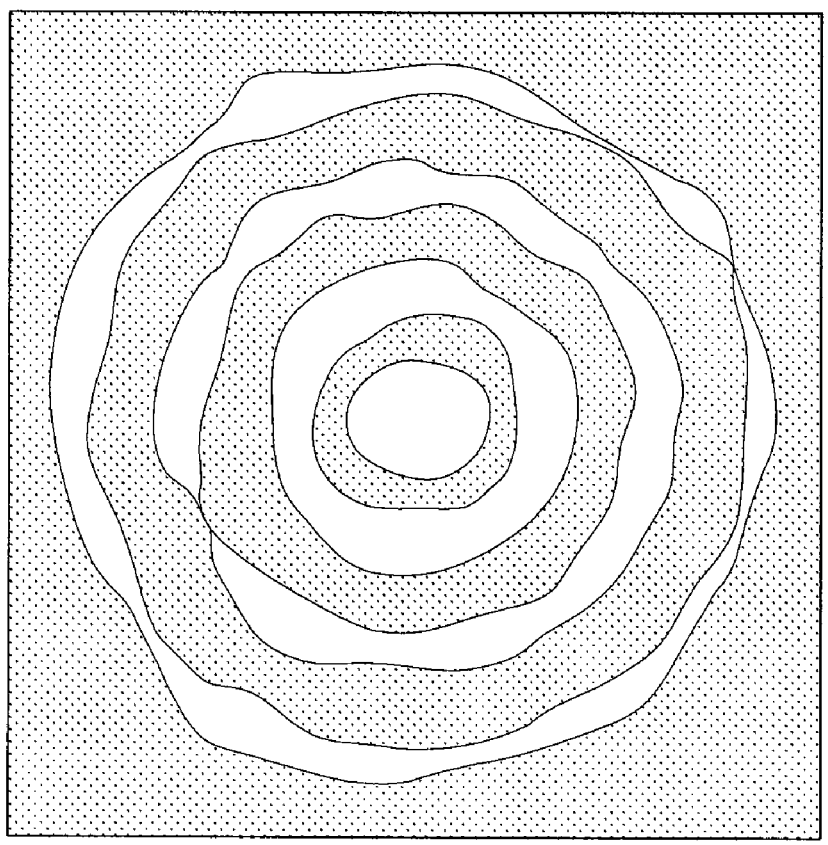
FIG. 5 is an illustration of a cross-sectional view of a Bessel beam formed by either of the systems of FIGS. 3 and 4 for measuring a laser-induced damage threshold in an optical fiber in accordance with an embodiment.

An example of a laser source or system that be used for the first and second laser sources 342 and 346 of FIG. 3 and laser source 404 of FIG. 4 may be a Q-switched neodymium-doped yttrium aluminum garnet (Nd:YAG) laser, such as a Seeded Surelite I-10 laser system available from Continuum, Inc., Santa Clara, Calif. Surelite is a trademark of Continuum, Inc. in the United States, other countries or both. The laser system may generate single longitudinal mode 7 nanosecond laser pulses. Laser pulses having other characteristics and continuous wave (CW) lasers may also be used for evaluating certain characteristics of the fiber under test. The laser pulses generated by the Nd:YAG laser system may have a Gaussian spatial profile with a predetermined diameter. For example depending upon placement of the elements, the laser pulses may have about a 10 mm diameter at the axicon 330. The axicon 330 converts the Gaussian beam into a Bessel beam with a predetermined length. If the laser pulses have a diameter of about 10 mm at the axicon 330, the Bessel beam may have a predetermined length more than about 10 mm depending upon a layout of the components and a cross-section 500 similar to that illustrated in FIG. 5. The Bessel beam may substantially match an elongated shape or predetermined length L of the core 308 of the fiber 302 and allows enhanced intensity or power density at the preselected location or portion 322 of the fiber 302 as previously described. The energies or power of the laser pulses may be increased by the laser source 346/404 or controller 348/406 in predetermined steps up to an energy or power level or threshold where laser-induced damage occurs or begins to occur. In this manner the energy level or power level or threshold at which laser-induced damage occurs may be measured. As previously discussed, laser-induced damage 341 may be observed by different simultaneous events, such as a residual crack in the damaged area, a visible cloud of plasma in the area of damage at the moment of damage, truncation of any laser beam being transmitted through the core, and scattering of light of a CW laser from the damaged area.

The laser-induced damage was found to occur in the area of the central maximum of the Bessel beam. This may occur because the power density at the maximum may be at least five times higher compared to the power density at a next maximum of the power distribution of the Bessel beam. The diameter or full width at half maximum (FWHM) of the central spot of the beam may be about 1.5 microns. The standard core of an optical fiber may be about 7-8 microns. The diameter of the cladding may be about 100 microns or more. Accordingly, the Bessel beam may be used for separate measurements of the fiber core and the fiber cladding laser-induced damage thresholds.

Referring back to FIG. 3, the first laser beam 306 and the second laser beam 316 may have the same parameters or different parameters or characteristics. For example, the second laser beam 316 directed on the exterior surface 322 of the fiber 302 may have different pulse durations, different wavelengths, different power settings or levels compared to the first laser beam 306 through the core 308. The first laser beam 306 may be synchronized with the second laser beam 316 to study the effects of the fiber core 308 during high-power exposure. Continuous wave (CW) laser beams may also be used to evaluate long term stability and defect accumulation in the fiber 302 under multiple pulse irradiation.

The combined irradiation of a core of an optical fiber by a laser beam transmitted through the core and also directed externally into the core as provided by the embodiments as described herein also have the advantage of allowing measurements of beam degradations and nonlinearities in fibers. Thus, operation of the first laser beam through the core and the second laser beam through an exterior surface of the optical fiber may be coordinated to evaluate effects on the optical fiber under different predetermined operation conditions. Examples of the effects may include modification of parameters associated with the optical fiber caused by the laser beams. The exposure of solids with high intensity beams results in modification of their parameters like absorption, refractive index, electron excitations, etc. Therefore, the beams propagating through these modified areas experience changes in spatial, temporal, and even spectral parameters. In other words, the interaction of a high power laser beam with solids results in appearance of different optical nonlinearities. Nonlinearity is typically only observed at very high light intensities such as those provided by pulsed lasers. Next, the beam propagation through nonlinear areas in solids results in transmitted beam modification or in degradation of beams parameters. The systems 300 and 400 make it possible to measure the parameters of the first beam 306 or 410 transmitted through the core area 308 of the fiber 302 modified by exposure of the high power second beam 316 or 412 or external beam and to measure degradations of the first beam 306 and 410. Conclusions about the nonlinearities can be determined from measuring the modified parameters of transmitted beam 306, such as temporal and spatial beam shapes, pulse energy or power of radiation, spectrum of the beam or similar parameters.

Although specific embodiments have been illustrated and described herein, those of ordinary skill in the art appreciate that any arrangement which is calculated to achieve the same purpose may be substituted for the specific embodiments shown and that the embodiments may have other applications in other environments. This application is intended to cover any adaptations or variations of the embodiments. The following claims are in no way intended to limit the scope of the disclosure to the specific embodiments described herein.

What is claimed is:

1. A system for measuring a laser-induced damage threshold in an optical fiber, comprising
    a lens that directs a first laser beam through a core of the optical fiber; and
    an optical arrangement that directs a second laser beam through an exterior surface of the optical fiber and into the core of the optical fiber at a preselected location of the optical fiber providing a predetermined power density at the preselected location, wherein the optical arrangement directs the second laser beam into the optical fiber providing the predetermined power density.

2. The system of claim 1, further comprising a controller to increase energy of the second laser beam in predetermined steps to measure an energy level or threshold at which laser-induced damage occurs.

3. The system of claim 1, further comprising a beam splitter to form the second laser beam from the first laser beam.

4. The system of claim 1, wherein the first laser beam and the second laser beam comprise the same characteristics.

5. The system of claim 1, wherein the second laser beam comprises different characteristics from the first laser beam and wherein operation of the first laser beam and the second laser beam are coordinated to evaluate effects on the optical fiber under different predetermined operating conditions.

6. The system of claim 1, wherein at least one of the first laser beam and the second laser beam is a continuous wave laser beam for evaluating stability and defect accumulation in the optical fiber over a predetermined time period.

7. The system of claim 1, wherein the optical arrangement comprises an optical element that converts a Gaussian laser beam to a Bessel laser beam.

8. The system of claim 1, wherein the optical arrangement comprises:
    a mirror to receive and reflect the second laser beam;
    an opening formed in the mirror, wherein the optical fiber is disposed through the opening and wherein the mirror forms the second laser beam into an annular shaped laser beam.

9. The system of claim 7, wherein the optical element comprises a structure that directs the Bessel laser beam on the optical fiber along a predetermined length of the optical fiber.

10. The system of claim 9, wherein the optical element comprises an axicon.

11. The system of claim 8, wherein the optical arrangement further comprises:
    an axicon to receive the annular shaped laser beam and to direct the annular shaped laser beam onto the optical fiber; and
    an opening formed in the axicon, wherein the optical fiber is disposed through the opening in the axicon.

12. The system of claim 11, wherein the optical arrangement further comprises an optical element optically coupled to the axicon, wherein the optical element comprises a refractive index similar to a refractive index of a cladding of the optical fiber to permit a portion the annular shaped laser beam to pass through the cladding and into the core of the optical fiber.

13. The system of claim 12, wherein the optical element comprises:
    a cell; and
    an immersion liquid contained in the cell, wherein a portion of the optical fiber under test is contained within the cell and wherein the immersion liquid has a refractive index substantially similar to the refractive index of the cladding of the optical fiber to permit the substantial portion of the annular shaped laser beam to pass through the cladding and into the core of the optical fiber.

14. The system of claim 13, wherein the cell comprises an input window to receive the annular shaped laser beam from the axicon.

15. The system of claim 14, wherein the cell further comprises an output window to permit observation of the annular shaped laser beam and alignment of the optical fiber relative to the annular shaped beam.

16. The system of claim 14, wherein the cell is transparent to permit observation of the optical fiber within the cell and to permit measurement of the laser-induced damage threshold.

17. A system for measuring a laser-induced damage threshold in an optical fiber, comprising
    an axicon;
    an opening formed in the axicon through which the optical fiber extends;
    a cell optically coupled to the axicon, wherein a portion of the optical fiber under test is contained within the cell and wherein the cell comprises:
    an input window to receive a laser beam from the axicon, wherein the axicon directs the laser beam through the input window of the cell and onto the optical fiber to provide a predetermined power density at a preselected location in a core of the optical fiber; and an immersion liquid contained in the cell, wherein the immersion liquid has a refractive index similar to a refractive index of a cladding of the optical fiber to permit a portion of the laser beam to pass through the cladding and into the core of the optical fiber.

18. The system of claim 17, further comprising a controller to increase energy of the laser beam in predetermined steps to measure an energy level or threshold at which laser-induced damage occurs.

19. The system of claim 17, wherein the axicon comprises a structure that converts a Gaussian laser beam to a Bessel laser beam and that directs the Bessel laser beam on the optical fiber along a predetermined length of the optical fiber.

20. The system of claim 17, further comprising a controller to control generation of the laser beam with different characteristics, wherein the different characteristics comprise a pulse duration, a wavelength, and a power level.

21. The system of claim 17, further comprising a lens to direct another laser beam through a core of the optical fiber.

22. A method for measuring a laser-induced damage threshold in an optical fiber, comprising:
   directing a first laser beam through a core of the optical fiber; and
   directing a second laser beam through an exterior surface of the optical fiber and into the core of the optical fiber at a preselected location of the optical fiber to provide a predetermined power density at the preselected location, wherein the second laser beam is directed into the optical fiber to provide the predetermined power density.

23. The method of claim 22, further comprising directing the second laser beam through a medium including a refractive index similar to a refractive index of a cladding of the optical fiber to permit a portion of the second laser beam to pass through the cladding and into the core of the optical fiber.

24. The method of claim 22, wherein the second laser beam is a Gaussian laser beam and wherein the method further comprises converting the Gaussian laser beam to a Bessel laser beam having a shape corresponding to a predetermined length of the optical fiber to be tested.

25. The method of claim 22, further comprising generating the first laser beam and the second laser beam to include different characteristics to measure an effect on the optical fiber under the different characteristics.

26. The method of claim 25, wherein the different characteristics comprise pulse temporal, spatial, and spectral shapes, and a power level.

27. A method for measuring a laser-induced damage threshold in an optical fiber, comprising:
   directing a laser beam through an exterior surface of the optical fiber and into a core of the optical fiber at a preselected location of the optical fiber, wherein the laser beam is directed into the optical fiber to provide a predetermined power density at the preselected location in the core of the optical fiber; and
   increasing an energy level of the laser beam in predetermined steps to measure an energy level or threshold at which laser-induced damage occurs.

28. The method of claim 27, further comprising converting the laser beam into a Bessel laser beam including a shape for being directed on the optical fiber along a predetermined length of the optical fiber.

29. The method of claim 27, further comprising forming the laser beam into a annular shape.

30. The method of claim 27, further comprising directing another laser beam through the core of the optical fiber.

* * * * *